(12) United States Patent
Scorteanu et al.

(10) Patent No.: US 6,662,641 B2
(45) Date of Patent: Dec. 16, 2003

(54) METHOD AND DEVICE TO MEASURE THE BRAKE FORCE FOR RAILROAD VEHICLES

(76) Inventors: Romel Scorteanu, 452 Chemin du Club Marin, Ile-des-Soeurs Montreal Quebec (CA), H3E 1V9; Alexandru Popistas, 201 Place Bonaventure, Brossard Quebec (CA), J4Z 2T6

( * ) Notice: Subject to any disclaimer, the term of this patent is extended or adjusted under 35 U.S.C. 154(b) by 0 days.

(21) Appl. No.: 09/681,812

(22) Filed: Jun. 9, 2001

(65) Prior Publication Data

US 2003/0010132 A1 Jan. 16, 2003

(51) Int. Cl.[7] .............................................. G01M 15/00
(52) U.S. Cl. ........................................ 73/121; 73/121
(58) Field of Search .............................. 73/121, 862.12, 73/862.629, 462, 1.79, 866.5, 493

(56) References Cited

U.S. PATENT DOCUMENTS 4,805,740 A  *  2/1989  Wilke et al. ................. 188/173

* cited by examiner

Primary Examiner—Kamand Cuneo
Assistant Examiner—Monica D. Harrison
(74) Attorney, Agent, or Firm—Kenneth A. Roddy

(57) ABSTRACT

A method to measure the brake force for railroad vehicles without replacing any part of the braking system, comprising the steps of opening a clearance between the braking elements, inserting a special sensor between the braking elements and applying the brake followed by the processing of the signal generated by the sensor and displaying the result in force units. A device to measure the brake force for railroad vehicles, which uses a sensor, the main part of which is a prismatic steel plate (3) with strain gauges (4a, 4b, 5a, 5b,) on both sides. To measure the brake force, the sensor is positioned, depending on the braking system, between the brake shoe (1) and the wheel tread (2) or between the brake pad and the brake disc. When the brake is applied, the sensor comes in contact with the braking surfaces (brake shoe/brake pad and wheel tread/brake disc) through (the intermediary of) four drill rods (6a, 6b, 7a, 7b,) affixed to the sensor body (3), two on each side, in such a way that the mechanical contact between each rod and the sensor body is over a line and the sensor is submitted to a bending moment. To make the device adaptable to any wheel diameter or wear of the brake components and to protect the brake shoe surface, each of the two rods (7a, 7b,) on the brake shoe side (for braking systems using a brake shoe), has a steel wing (8a, 8b,) elastically seated on it. The wings are kept in place by three rubber membranes (9, 11a, 11b,) connecting the wings between them and to the sensor body. The sensor is kept in place during measurements by two sets of magnets (13a, 13b) embedded into two rubber strips (12a, 12b,) bonded on two opposite sides of the sensor body (3).

8 Claims, 4 Drawing Sheets

METHOD AND DEVICE TO MEASURE THE BRAKE FORCE FOR RAILROAD VEHICLES

BACKGROUND OF INVENTION

1. Field of the Invention

The present invention relates to a method to measure the brake force for railroad vehicles and it relates also to a portable device to measure the brake force for railroad vehicles according to the above-mentioned method. More specifically the present invention is related to a method to measure the brake force for railroad vehicles without replacing the brake shoe, brake pad or any other component of the braking system and to display the measured value straight in force units.

2. Brief Description of the Prior Art

Railroad vehicles are generally equipped with an air braking system, which typically for freight railcars and locomotives, operates a brake shoe assembly that in turn applies the brake force to the wheel tread. Some passenger coaches use a different braking system the main components of which are a brake disc and brake pads with the pads being pressed against the disc when the brake is applied.

Government regulations related to railroad safety operation require braking system testing for all new equipment, before they are released for service, and for all in-service equipment. These testing address mainly the performance of the braking systems, the wear aspects and the brake force. Maintenance procedures in force at every railroad administration also call for periodic testing of the braking systems. The American Association of Railroads (AAR) require certain minimum acceptable brake force levels for certain vehicle weights to insure proper braking of railway equipment. The AAR also require specific standards for measuring the rake force.

All the measuring devices currently in use to measure the brake force for systems using a brake shoe pressing against the wheel tread require the removal of the actual brake shoe and its replacement with a special brake force-measuring shoe.

The oldest known device (still being used today) to measure the brake force is the so-called simulated brake shoe. This device looks like a conventional brake shoe but it is made of steel (instead of cast iron or composition) and has strain gauges bonded on it. To measure the brake force, the actual brake shoe must be replaced with this simulated brake shoe, which is large and heavy; the signal generated and displayed is then processed by qualified personnel to determine the brake force magnitude. The measurement errors, the largest when compared with errors from any other known brake force measuring device, are related to the friction in the rigging and to the positioning of the simulated brake shoe.

Another known and widespread device is the single contact point wheel/compression load cell (also known under the name "Jim Shoe") which uses one "ready made" load cell mechanically attached to an adapter and connected through a switching box to an indicator. This device is unstable, hazardous and consequently generates another class of measurement errors. When the brake force is applied, the compression load cell button slides over the wheel tread surface until equilibrium is reached. At this random equilibrium location, the output signal of the measuring system is altered by the effect of bending due to the non-radial position of the compression load cell, leading to non—repeatable brake force test results. Furthermore, the single point contact unstable condition is magnified when the brake forces are fast applied (for instance in case of an emergency braking), when relatively high braking forces are required and when wider shoe rotations are allowed by the brake specific design.

One other known brake force measuring device (called by its designers "railcar brake tester") is described in U.S. Pat. No. 5,038,605. Because of the multiple contact points feature of this device, the sliding effect is virtually eliminated. However, its very complex design (passage ways for the electric wires, retainer being held in place by threaded members, the general design of the cell body with bent endings, an asymmetrical design related to the mechanical attachment of the electrical connector) leads to errors related to the non—linearity and non—repeatability of the measurements. Also, the friction between the retainer and the shoe head, which cannot be controlled from one test to the next and even during the same test, will generate another class of errors.

As it can be seen, all the measuring devices currently in use to measure the brake force for systems using a brake shoe pressing against the wheel tread, suffer from a variety of shortcomings. All require the removal of the actual brake shoe and its replacement with a special brake force-measuring shoe. These measuring shoes are bulky, heavy, difficult to transport and therefore inconvenient to use. Also, as it was mentioned before, for most devices the displayed value must be further processed by qualified personnel to determine the brake force magnitude expressed in specific units (lb, N, Kgf). Furthermore, because the replacement of the actual brake shoe with a measuring shoe alters the friction in the rigging assembly, the measured brake force is prone to errors. Other shortcomings, mentioned above, were related to the non-linearity, non-repeatability and relatively poor accuracy of the measurements.

Because of the complexity of the existing brake force measurement methods and sensor configurations, as a recommended railway practice, the brake cylinder pressure is frequently measured in order to obtain an indirect brake force assessment. This practice is not a measurement per se; it only makes it possible to estimate the brake force magnitude by computing. As such, it cannot be compared with a brake force-measuring device. It should be noted, however, that the accuracy of this estimation is poor.

SUMMARY OF INVENTION

The purpose of the present invention is to provide a new, simpler and more accurate method to measure the brake force for railroad vehicles and which can be used for any type of railcar braking systems. The present invention eliminates the cumbersome task of replacing the actual brake shoe with a specialized measuring shoe. Instead, according to this method, a clearance is opened between the main braking components (brake shoe and wheel tread or brake pads and brake disc), clearance, which is large enough to allow the insertion of a special sensor between these components. The main part of this sensor is a prismatic steel plate with strain gauges bonded on two opposite sides. When the brake is applied, the sensor is compressed between the braking surfaces. Unlike the configuration used by existing brake force testers (single or multiple contact points with the braking surface), the sensor according to the invention comes in contact with the braking surfaces (brake shoe/wheel tread or brake pad/brake disc) through the intermediary of four drill rods. The rods are affixed to the sensor body, two facing the brake shoe and the other two facing the wheel tread. Thus, the mechanical contact between the four rods and the sensor body is over four lines. This configuration virtually eliminates a class of errors related to the non-repeatability of brake force measurements The rods are positioned in such a way (the two on the wheel side near the center of the sensor and the two on the brake shoe side near opposite edges of the sensor) that when the brake is applied the sensor body will be submitted to a bending moment. The signal generated by the strain gauges is processed and displayed on an indicator calibrated in force units. To insure its adaptability to any wheel diameter or wear of the brake components, to improve the consistency of the measurements and to prevent the brake shoe surface deterioration, the sensor uses two steel wings (steel plates of rectangular shape). These wings are elastically seated on the two rods affixed on the brake shoe side of the sensor (for braking systems using a brake shoe) and they are kept in place by rubber membranes. During measurements, the sensor is kept in place by magnets elastically connected to the sensor body.

OBJECTS OF THE INVENTION

It is, therefore, one of the primary objects of the present invention to provide a method and a device (the main part of which is a sensor) to measure the brake force for railroad vehicles, which do not require the removal of the brake shoe and its replacement with a special instrumented brake shoe.

Another object of the present invention is to provide a sensor, which is small enough to allow its insertion between the main braking components (brake shoe/wheel tread or brake pad/brake disc).

Still another object of the present invention is to provide a sensor, to be used for measuring the brake force, whose performance is not dependent on the wear condition of the brake shoe.

Yet another object of the present invention is to provide a sensor, to be used as above, whose performance is not dependent on the brake shoe material (cast iron or composition).

A further object of the present invention is to provide a sensor which, when used to measure the brake force, does not alter the friction in the rigging.

An additional object of the present invention is to provide a sensor whose performance, when used as above, does not depend on the rail vehicle wheel diameter.

Another object of the present invention is to provide a sensor, to measure the brake force, which can be used for any position of the brake shoe relative to the wheel (or brake pad relative to the brake disc).

Still yet another object of the present invention is to provide a sensor having means, which allow to position it and to keep it in place during measurements.

A still further object of the present invention is to provide a measuring device (sensor) for the brake force whose indication does not change when repeated measurements on the same brake configuration are done (high degree of repeatability) and this feature does not depend on the wheel diameter, brake shoe material (cast iron or composition), brake shoe positioning relative to the wheel, brake shoe wear and wheel tread wear.

Figure 1:
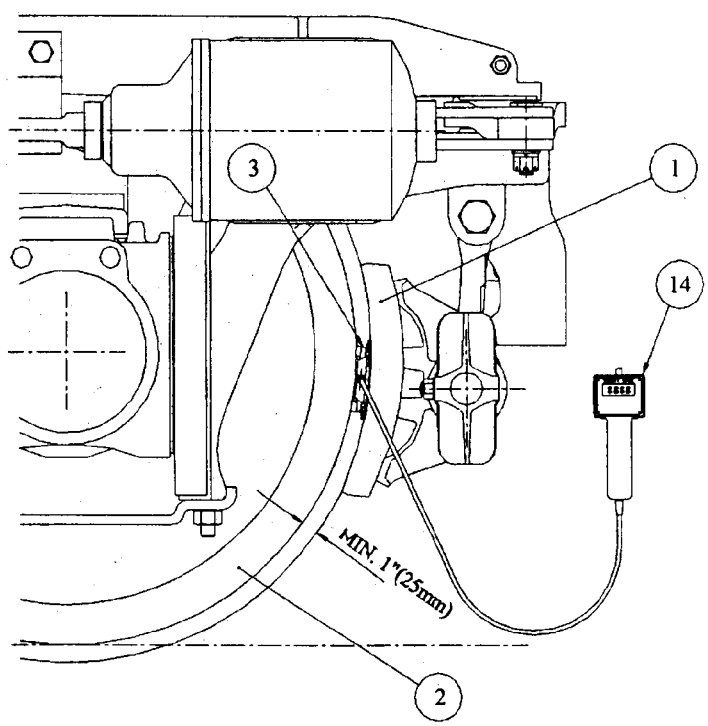
FIG. 1 is a side elevation view of a typical brake truck arrangement with the system's sensor positioned for measurement.

Another object of the present invention is to provide an alternate brake force sensor, easy to use and inexpensive, to replace the brake cylinder pressure measurement currently used to indirectly assess the brake force.

In addition to the objects and advantages of the railway vehicle brake force measuring device mentioned above, other advantages will become apparent from the following more detailed description of a preferred embodiment of the present invention when taken also in conjunction with the accompanying drawings.

DESCRIPTION OF THE PREFERRED EMBODIMENT OF THE INVENTION

As mentioned above, all known methods and devices used to measure the brake force for railway vehicles require the replacement of the brake shoe with a special brake force-measuring shoe (or similarly the replacement of the brake pad with a measuring pad).

Unlike the known methods and devices, according to the present invention, the brake force is measured directly by inserting a special device (sensor) between the braking surfaces. So, "directly" refers to the fact that currently what is measured is the brake force applied by a measuring shoe, not by the actual brake shoe, with all the shortcomings and limitations mentioned above (this preferred embodiment of the invention refers to the measurement of the brake force for a system using a brake shoe pressed against the wheel tread).

By using a pry bar, a clearance of about one inch can be created between the brake shoe 1 and the wheel tread 2 when the brake is not applied. This will allow the insertion (slide-in) of a special sensor, described further, into this clearance.

According to the present invention, the main part of this sensor is a prismatic steel plate 3 (called further the sensor body) of rectangular section, with strain gauges 4a, 4b, bonded on the side facing the wheel, and 5a, 5b, bonded on the side facing the brake shoe.

During the measurements, the braking force is transmitted to the sensor through the intermediary of four drill rods 6a, 6b, 7a, and 7b, affixed to the sensor body 3. Two of these rods 6a, 6b, are affixed on the wheel side and the other two rods 7a, 7b, are affixed on the brake shoe side of the sensor body. The rods 6a, 6b, on the wheel side are positioned close to the center of the sensor body 3, while the rods 7a, 7b, on the brake shoe side, are close to opposite edges of that side and parallel with these edges (and parallel with the other two rods). When the measuring device according to the invention is ready for a measurement, these rods will be also parallel with the wheel's shaft, as it will be understood. This positioning of the four rods insure that the sensor body 3 will be submitted to a strong bending moment when the brake is applied and thus will increase the accuracy of the measurement.

In this preferred embodiment of the invention, the rods 6a, 6b, 7a, 7b, are affixed on the sensor body 3 with small steel pins 14. These pins 14 are installed in holes of appropriate size in both the rods and the sensor body.

Using this arrangement (two rods affixed to the side of the sensor body facing the wheel), the mechanical contact between the sensor and the wheel tread is over two lines (corresponding to the two rods). Compared with the prior art (single or multiple contact points between the braking element and the braking surface), having a contact over two lines presents a great advantage related to the repeatability of the measurements as it was explained before.

Figure 2:
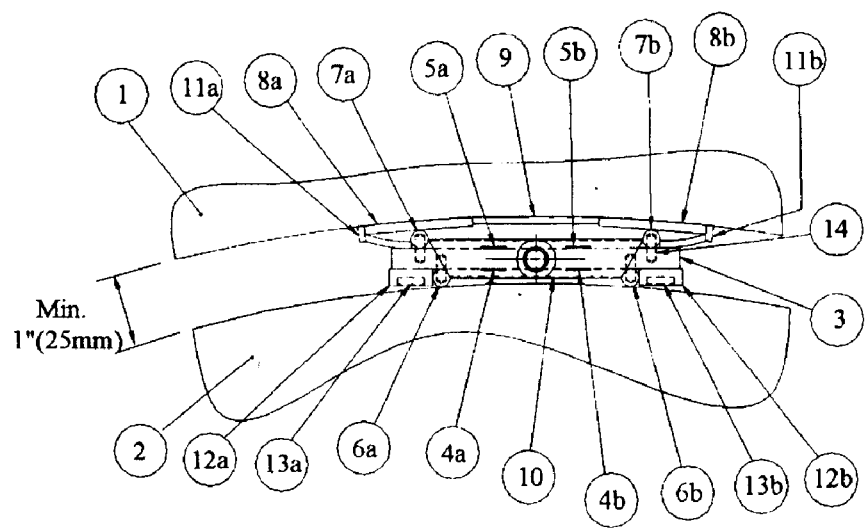
FIG. 2 is a detailed side view of the system's sensor during a measurement, squeezed between the braking surfaces (brake shoe/wheel tread)
Figure 3:
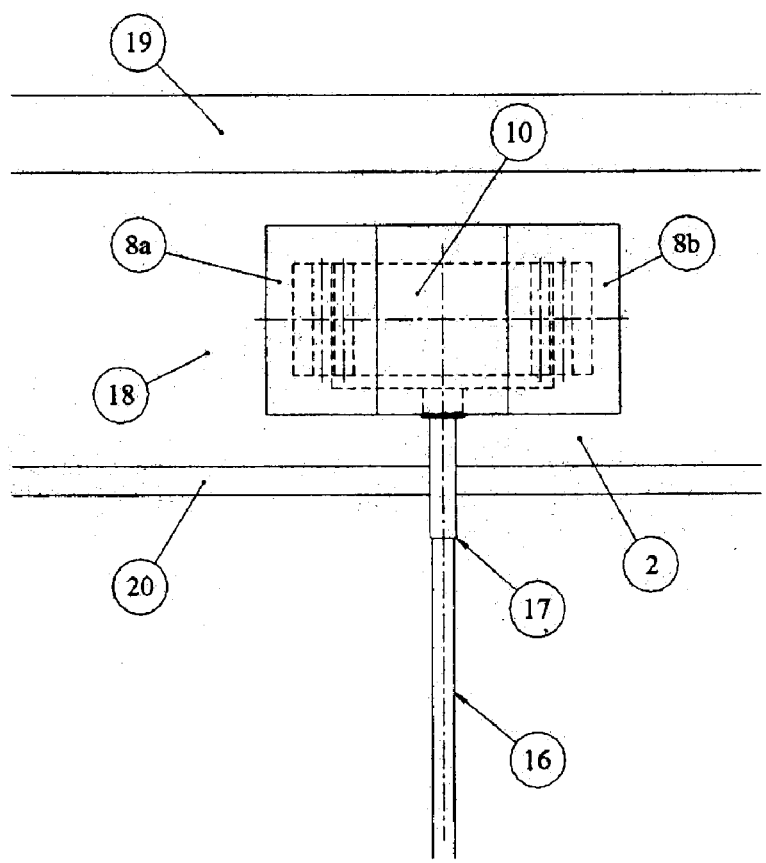
FIG. 3 is a simplified front view of the sensor in its working position while taking a measurement.

The diameter of the four drill rods 6a, 6b, 7a, 7b, is small (about 0.25 inch) because of the constraints imposed by the available space (clearance) between the wheel tread and the brake shoe. While the majority of the brake shoes are made of cast iron, some are made of a special composition, which is less hard than cast iron. During the measurements, when the brake is applied, the rods on the brake shoe side 7a, 7b might penetrate the surface of the composition shoes (because of their small diameter) and alter the measurement results. To prevent this from happening, on the brake shoe side, each of the two rods 7a, 7b, has a steel plate (called further a "wing") 8a, 8b, seated on its top. Each wing is a rectangular plate made of hardened steel and is elastically seated on the corresponding rod. In a preferred embodiment the wings are kept in place by three rubber membranes 9, 11a, 11b, as it can be seen in FIG. 2. One of the membranes, 9, connects the two wings between them. The other two membranes, 11a, 11b, connect the opposite side of the two wings to the sensor body 3.

This configuration (sensor body, rods, wings) insures that the contact between the two rods 7a, 7b, and the wings 8a, 8b, is over two lines while the contact between the wings and the brake shoe is over the entire surface of the wings and consequently the brake shoe surface is protected against penetration. An additional advantage of using the wing configuration is related to the consistency of the measurements. Finally, still another advantage is achieved by using this configuration. The wings 8a, 8b, which are elastically seated on the rods 7a, 7b, together with the small size of the sensor body 3, make this portable brake force-measuring device adaptable to any railcar wheel diameter, to any wear of the brake components and to any railcar braking systems (brake shoe/wheel tread or brake pad/brake disc).

A cover 10 permanently protects the part of the sensor body where the strain gauges are bonded.

Figure 4:
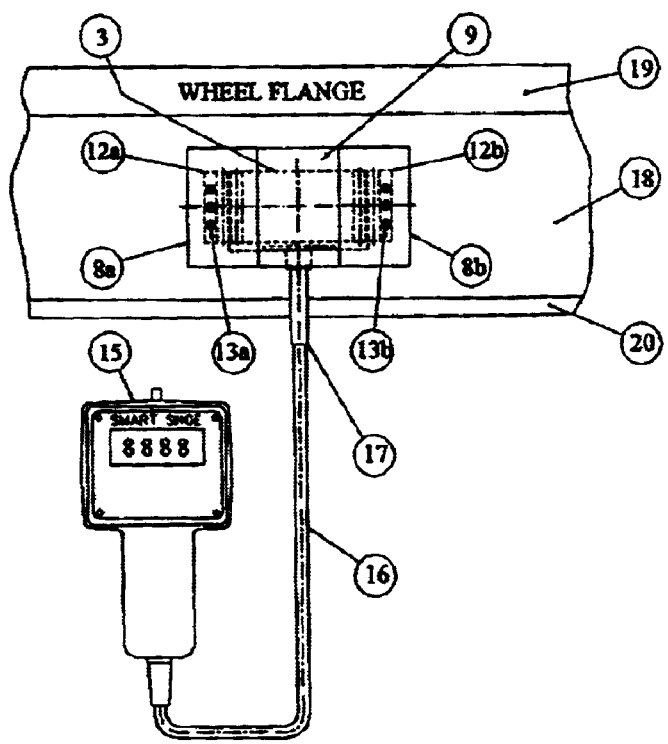
FIG. 4 is a more detailed front view of the measuring device according to the present invention including the sensor, the harness and the display.

The sensor assembly must be kept in place (between the brake shoe 1 and the wheel tread 2) while making a measurement and also for successive brake applications. This is achieved by using two sets of small magnets 13a, 13b, as seen in FIG. 4. Each set of magnets is embedded into one rubber strip 12a and 12b respectively. The two strips are bonded on opposite sides of the sensor body 3.

The measured brake force is displayed on an indicator 15, which is electrically connected with the sensor assembly via a cable 16. At the sensor assembly's end, the cable is equipped with a tail 17 which can also be used as a handle.

A typical measuring cycle of the brake force consists of three steps.

In the first step, with the brake released (not applied), a clearance of at least one inch is created by using a pry bar to push the brake shoe 1 away from the wheel 2.

In the second step, the sensor is positioned for the measurement. This is done by holding the tail 17 and carefully sliding the sensor between the brake shoe 1 and the wheel tread 2 while making sure that the two wings 8a, 8b, are facing the brake shoe. The sensor should then be aligned with the brake shoe while making certain that the sensor's two rods on the wheel's side 6a, 6b, are resting on the wheel tread 18, making sure that the sensor is not touching the wheel flange 19 and not sitting on the wheel chamfer 20. This correct position of the sensor is maintained during the measurement by the two sets of magnets 13a, 13b. After the alignment, the indicator 15 is turned ON and the display is zeroed.

In the third step the brake is applied and the brake force is measured and displayed straight in force units. The measurement should be read after about half a minute to allow time for the brake force to stabilize. After the measurement is completed and the brake is released, the sensor is easily removed by pulling it out with the tail 17.

The measurement accuracy achieved by using the portable brake-measuring device according to the present invention is in the 1% range. However, for increased accuracy, a pair of sensors can be used on some brake system arrangements. Furthermore, by using known wireless technology, the inconvenience of cables (16) will be eliminated and one can measure the brake force for one wheel or for two opposite wheels simultaneously, with increased accuracy (again, for some brake system arrangements). Similarly, this technology can be used for several wheels belonging to the same truck (bogie) or to a complete car.

While a preferred embodiment and some possible improvements of the present invention have been described above, it should be understood that many other modifications and/or adaptations are of course possible without departing from either the spirit of the invention or the scope of the appended claims.

What is claimed is:

1. A method for measuring the brake force of railroad vehicle brake systems having either rotary wheel tread and brake shoe braking surfaces or brake disc and brake pad braking surfaces, without replacing the brake shoe, brake pad, or any other part of the existing braking system, comprising the steps of:

(a) providing a bending moment sensor device equipped with strain gauge means for producing a signal corresponding the bending moment of said sensor device;

(b) while the vehicle brake is not applied, opening a clearance space between the braking surfaces, said clearance space being sufficiently small so as to be within operational limits of the braking system;

(c) inserting said bending moment sensor device into the clearance space between the braking surfaces so as to be pressed therebetween upon application of the vehicle brakes;

(d) applying the vehicle brake to subject said sensor device to a bending moment and thereby cause said strain gauge means to generate a bending moment signal corresponding to the bending moment of said sensor device; and (e) processing said bending moment signal into units of force and displaying the result in units of force representing the braking force applied between the braking surfaces.

2. The method according to claim 1, comprising the further step of:

removing said sensor device from the clearance space after completion of measuring the brake force.

3. A portable measuring device for measuring the brake force of railroad vehicle brake systems having either rotary wheel tread and brake shoe braking surfaces or brake disc and brake pad braking surfaces, the measuring device comprising:

sensor means having a flexible body sized and shaped to be removably positioned in a clearance space between the braking surfaces when the brakes are not applied and contact means on said body disposed in a line parallel to the axis of rotation of the rotary wheel tread or brake disc to become pressed between said braking surfaces upon application of the vehicle brakes and thereby subject said body to a bending moment;

strain gauge means on said body for producing a bending moment signal corresponding the bending moment of said body; and electronic circuit and display means connected with said strain gauge means for processing said bending moment signal generated by said strain gauge means into units of force and displaying the result in units of force representing the braking force applied between the braking surfaces.

4. The portable measuring device according to claim 3, wherein said body comprises a generally rectangular steel plate having parallel first and second outer surfaces and opposed ends, said first outer surface adapted to face the brake shoe or brake pad braking surface, and said second outer surface adapted to face either the rotary wheel tread or brake disc braking surface; and said contact means comprises a first pair of rod members secured transversely to said first outer surface in parallel spaced apart relation, and a second pair of rod members secured transversely to said second outer surface in parallel spaced apart relation;

each of said rod members having a longitudinal axis disposed in a line parallel to the axis of rotation of the rotary wheel tread or brake disc, and the spacing between said first pair of said rod members and the spacing between said second pair of rod members being different so as to subject said body to a bending moment upon application of the vehicle brakes.

5. The portable measuring device according to claim 4, further comprising:

a pair of flat rectangular plates resiliently and movably supported on said body in spaced apart relation, each having an inward facing surface seated on a respective one of said first pair of rods and an outward facing surface adapted to engage the brake shoe or brake pad braking surface when the vehicle brakes are applied;

said plates being independently movable to facilitate engagement with vehicle wheel treads of different diameter, to compensate for wear of the braking surfaces, to insure the consistency of measurements, to accommodate relative motion, rotation and displacement between the braking surfaces, to prevent damage to the brake shoe or brake pad braking surfaces during measurements, and allow brake force measurements of braking surfaces of different materials.

6. The portable measuring device according to claim 4, further comprising:

temporary retaining means on said body for retaining said sensor in a proper position during the measurement operation.

7. The portable measuring device according to claim 6, wherein said temporary retaining means comprises at least one magnet mounted on said second outer surface to temporarily retain said body on either the rotary wheel tread or brake disc braking surface.

8. The portable measuring device according to claim 7, wherein said at least one magnet is embedded in a resilient strip secured to said second outer surface.

* * * * *